US012435782B2

(12) United States Patent
Sakai et al.

(10) Patent No.: US 12,435,782 B2
(45) Date of Patent: Oct. 7, 2025

(54) TABLE DRIVING DEVICE

(71) Applicant: NIPPON THOMPSON CO., LTD., Tokyo (JP)

(72) Inventors: Tetsuya Sakai, Toki (JP); Kousuke Tobari, Toki (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 7 days.

(21) Appl. No.: 18/566,402

(22) PCT Filed: Mar. 30, 2022

(86) PCT No.: PCT/JP2022/016047
§ 371 (c)(1),
(2) Date: Dec. 1, 2023

(87) PCT Pub. No.: WO2022/270115
PCT Pub. Date: Dec. 29, 2022

(65) Prior Publication Data
US 2024/0247710 A1 Jul. 25, 2024

(30) Foreign Application Priority Data
Jun. 23, 2021 (JP) .................... 2021-104205

(51) Int. Cl.
*F16H 57/021* (2012.01)
*F16H 1/16* (2006.01)
(Continued)

(52) U.S. Cl.
CPC ............. *F16H 57/021* (2013.01); *F16H 1/16* (2013.01); *F16H 2057/02034* (2013.01);
(Continued)

(58) Field of Classification Search
CPC ............... F16H 2057/0213; F16H 2057/02034
See application file for complete search history.

(56) References Cited

U.S. PATENT DOCUMENTS 2,335,606 A * 11/1943 Pelphrey ................... F16H 1/16
74/396
5,834,662 A * 11/1998 Stoll ....................... B66C 23/84
74/411

(Continued)

FOREIGN PATENT DOCUMENTS

| CN | 115707886 A * | 2/2023 | ............. B23Q 1/265 |
| JP | 2013-076421 A | 4/2013 | |
| JP | 2013-226898 A | 11/2013 | |

*Primary Examiner* — Daniel D Yabut
(74) *Attorney, Agent, or Firm* — Oliff PLC

(57) ABSTRACT

A table driving device includes a first housing having first and second housing holes, a first bearing fitted in the first housing hole, a shaft member inserted in the first bearing and second housing hole, a second housing including an annular portion inserted between an inner surface surrounding the second housing hole and shaft member, a second bearing between the annular portion and shaft member, and a bracket. An annular space is formed between the annular portion and shaft member. The bracket includes a first protruding portion inserted into the annular space, which is in contact with an end surface of the second bearing and with at least part of the annular portion so that a center of the annular portion is located inside a triangle obtained by connecting three points selected from a part of the first protruding portion in contact with the inner surface of the annular portion.

4 Claims, 6 Drawing Sheets

(51) Int. Cl.
*F16H 57/02* (2012.01)
*F16H 57/039* (2012.01)

(52) U.S. Cl.
CPC .............. *F16H 2057/02073* (2013.01); *F16H 2057/0213* (2013.01); *F16H 57/039* (2013.01)

(56) References Cited

U.S. PATENT DOCUMENTS

| | | | |
|---|---|---|---|
| 2002/0088305 A1* | 7/2002 | Kitagawa | H02K 7/081 |
| | | | 74/813 R |
| 2013/0283940 A1 | 10/2013 | Boussaguet et al. | |
| 2015/0075899 A1 | 3/2015 | Kikuchi et al. | |
| 2022/0120339 A1* | 4/2022 | Kato | F16H 13/08 |

* cited by examiner

TABLE DRIVING DEVICE

TECHNICAL FIELD

The present disclosure relates to a table driving device. The present application claims priority based on Japanese Patent Application No. 2021-104205 filed on Jun. 23, 2021, the entire contents of which are incorporated herein by reference.

BACKGROUND ART

Conventionally, a device that converts rotary motion of a motor into linear motion to linearly drive a table is known (see, for example, Patent Literature 1).

Patent Literature 1 describes an electric actuator that includes a motor, a housing to which the motor is fixed, a feed screw mechanism housed in the housing and operative to convert rotary motion of the motor into linear motion, and a bearing arranged between an outer circumferential surface of the feed screw mechanism and an inner circumferential surface of the housing. The housing has a plurality of tubular components installed side by side in the axial direction.

CITATION LIST

Patent Literature

Patent Literature 1: Japanese Patent Application Laid-Open No. 2013-76421

SUMMARY OF INVENTION

Technical Problem

In the electric actuator of Patent Literature 1, in installing the tubular components constituting the housing side by side in the axial direction, the aligning operation between the components may become complicated.

An object of the present disclosure is to provide a table driving device that enables easy aligning between components.

Solution to Problem

A table driving device according to the present disclosure includes: a first housing extending in an axial direction and having formed therein a first housing hole and a second housing hole each having a circular cross section perpendicular to the axial direction, the first housing hole and the second housing hole being spaced apart from each other in the axial direction and having coincident central axes; a first bearing fitted in the first housing hole; a shaft member extending in the axial direction and inserted in the first bearing and the second housing hole; a second housing including an annular portion, the annular portion being inserted in between an inner circumferential surface surrounding the second housing hole and an outer circumferential surface of the shaft member and following the inner circumferential surface; a second bearing fitted in between an inner circumferential surface of the annular portion and the outer circumferential surface of the shaft member; a motor operative to rotate the shaft member about an axis; a bracket arranged between the motor and the second housing; and a table driven in accordance with rotation of the shaft member about the axis. An annular space is formed between the inner circumferential surface of the annular portion and the outer circumferential surface of the shaft member, the inner circumferential surface of the annular portion being cylindrical and having a coincident central axis with an outer circumferential surface thereof, the space being adjacent to the second bearing on the bracket side in the axial direction and surrounding the outer circumferential surface of the shaft member. The bracket includes a base portion, and a first protruding portion protruding from the base portion on the second housing side, the first protruding portion being inserted into the annular space and following the inner circumferential surface of the annular portion. The first protruding portion is in contact with an end surface of the second bearing in the axial direction. As viewed in the axial direction, the first protruding portion is in contact with at least a part of the inner circumferential surface of the annular portion in such a manner that a center of the annular portion is located inside a triangle obtained by connecting three points selected arbitrarily from a part of the first protruding portion in contact with the inner circumferential surface of the annular portion.

Advantageous Effects of Invention

The present disclosure is able to provide a table driving device that enables easy aligning between the components.

DESCRIPTION OF EMBODIMENTS

Outline of Embodiments

Figure 1:
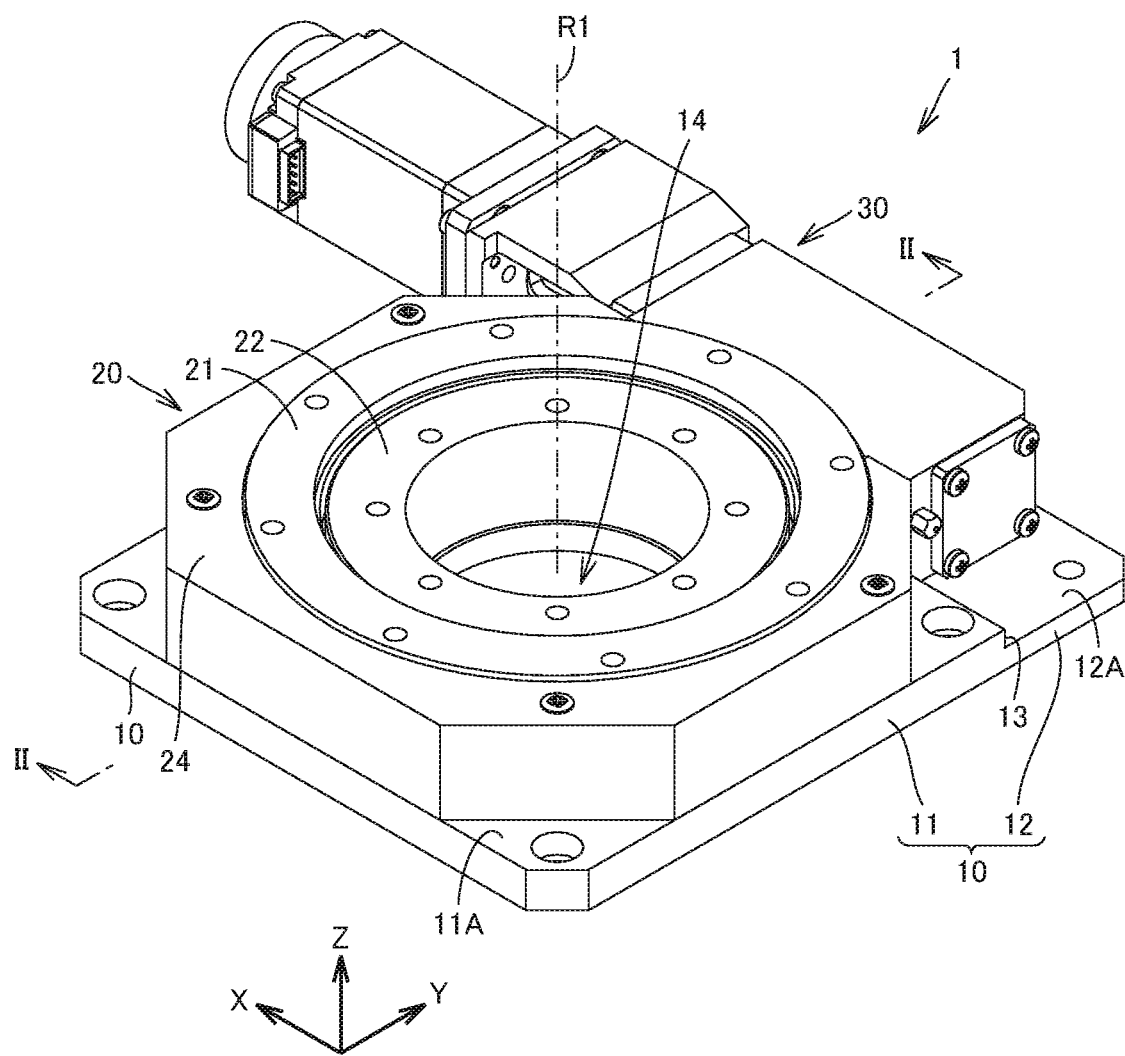
FIG. 1 is a perspective view showing the overall configuration of a table driving device according to Embodiment 1.

A table driving device according to the present disclosure includes: a first housing extending in an axial direction and having formed therein a first housing hole and a second housing hole each having a circular cross section perpendicular to the axial direction, the first housing hole and the second housing hole being spaced apart from each other in the axial direction and having coincident central axes; a first bearing fitted in the first housing hole; a shaft member extending in the axial direction and inserted in the first bearing and the second housing hole; a second housing including an annular portion, the annular portion being inserted in between an inner circumferential surface surrounding the second housing hole and an outer circumferential surface of the shaft member and following the inner circumferential surface; a second bearing fitted in between an inner circumferential surface of the annular portion and the outer circumferential surface of the shaft member; a motor operative to rotate the shaft member about an axis; a bracket arranged between the motor and the second housing; and a table driven in accordance with rotation of the shaft member about the axis. An annular space is formed between the inner circumferential surface of the annular portion and the outer circumferential surface of the shaft member, the inner circumferential surface of the annular portion being cylindrical and having a coincident central axis with an outer circumferential surface thereof, the space being adjacent to the second bearing on the bracket side in the axial direction and surrounding the outer circumferential surface of the shaft member. The bracket includes a base portion, and a first protruding portion protruding from the base portion on the second housing side, the first protruding portion being inserted into the annular space and following the inner circumferential surface of the annular portion. The first protruding portion is in contact with an end surface of the second bearing in the axial direction. As viewed in the axial direction, the first protruding portion is in contact with at least a part of the inner circumferential surface of the annular portion in such a manner that a center of the annular portion is located inside a triangle obtained by connecting three points selected arbitrarily from a part of the first protruding portion in contact with the inner circumferential surface of the annular portion.

In the above table driving device, the first housing hole and the second housing hole are formed in one step in which a drill or other tool, for example, is linearly moved, so the two holes have coincident central axes. Therefore, as the first bearing is fitted in the first housing hole and the shaft member is inserted in the first bearing and the second housing hole, the central axis (rotation axis) of the shaft member coincides with the central axes of the first housing hole and the second housing hole. Then, the annular portion of the second housing, having an outside diameter substantially identical to the inside diameter of the second housing hole, is inserted in between the inner circumferential surface surrounding the second housing hole and the outer circumferential surface of the shaft member, whereby the central axis of the annular portion coincides with the central axes of the first housing hole, the second housing hole, and the shaft member.

In this state, the first protruding portion of the bracket is inserted into the annular space, which is located between the outer circumferential surface of the shaft member and the cylindrical inner circumferential surface of the annular portion having a coincident central axis with the outer circumferential surface thereof and is adjacent to the second bearing on the bracket side. The first protruding portion is brought into contact with at least a part of the inner circumferential surface of the annular portion in such a manner that the center of the annular portion is located inside a triangle obtained by connecting three points selected arbitrarily from a part of the first protruding portion in contact with the inner circumferential surface of the annular portion. In this manner, aligning of the bracket with respect to the first housing, the second housing, and the shaft member can be easily performed. Moreover, as the first protruding portion is in contact with the end surface of the second bearing in the axial direction, the first protruding portion can press the second bearing in the axial direction. This eliminates the need to provide another member for pressing the second bearing, leading to reduction in the number of components.

In the above table driving device, the first protruding portion may be in contact with the inner circumferential surface of the annular portion over an entire circumferential direction thereof. According to this configuration, the first protruding portion has an annular shape, increasing the rigidity of the first protruding portion as compared to the case where the first protruding portion is composed of a plurality of arc-shaped portions spaced apart from each other. This can suppress deformation in the radial direction of the first protruding portion, thereby improving the accuracy in installation of the bracket with respect to the second housing.

In the above table driving device, the base portion may have formed therein a first bracket hole surrounded by the first protruding portion and having a circular cross section perpendicular to the axial direction, and a second bracket hole having a circular cross section perpendicular to the axial direction. The first bracket hole and the second bracket hole may be spaced apart from each other in the axial direction and may have coincident central axes. The motor may include a body portion, and a second protruding portion protruding from the body portion on the bracket side, the second protruding portion being inserted into the second bracket hole and following an inner circumferential surface surrounding the second bracket hole. As viewed in the axial direction, the second protruding portion may be in contact with at least a part of the inner circumferential surface surrounding the second bracket hole in such a manner that a center of the second bracket hole is located inside a triangle obtained by connecting three points selected arbitrarily from a part of the second protruding portion in contact with the inner circumferential surface surrounding the second bracket hole. According to this configuration, it is possible to easily perform aligning of the motor with respect to the first housing, the second housing, the shaft member, and the bracket.

In the above table driving device, the second protruding portion may be in contact with the inner circumferential surface surrounding the second bracket hole over an entire circumferential direction thereof. According to this configuration, the second protruding portion has an annular shape, increasing the rigidity of the second protruding portion as compared to the case where the second protruding portion is composed of a plurality of arc-shaped portions spaced apart from each other. This can suppress deformation in the radial direction of the second protruding portion, thereby improving the accuracy in installation of the motor with respect to the bracket.

SPECIFIC EMBODIMENTS

Specific embodiments of the table driving device of the present disclosure will be described below with reference to the drawings. In the drawings referenced below, the same or corresponding portions are denoted by the same reference numerals and the description thereof will not be repeated.

Embodiment 1

Figure 2:
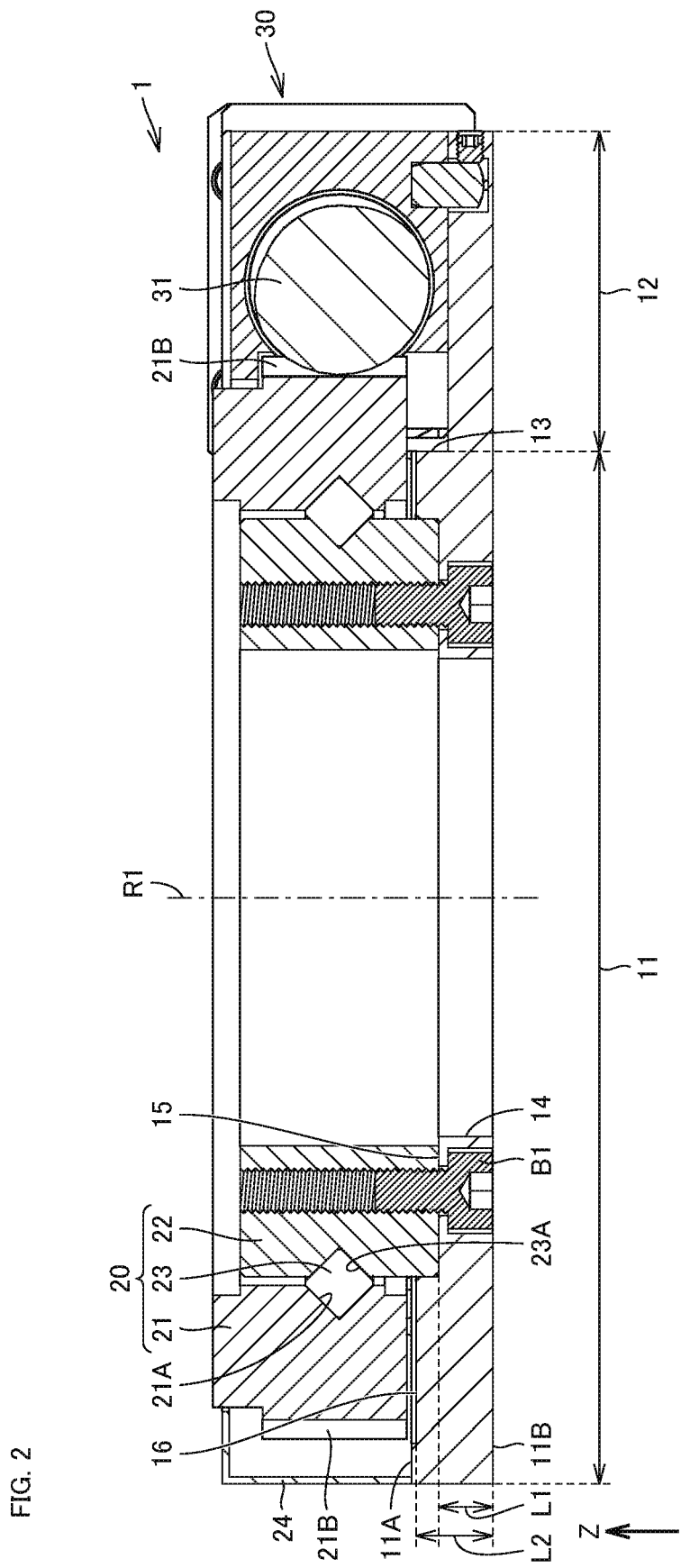
FIG. 2 is a cross-sectional view along the line II-II in FIG. 1.

First, an overall configuration of the table driving device 1 according to Embodiment 1 will be described with reference to FIGS. 1 and 2. FIG. 1 is a perspective view showing the overall configuration of the table driving device 1. FIG. 2 is a cross-sectional view along the line II-II in FIG. 1.

The table driving device 1 according to the present embodiment is a rotary table. As shown in FIG. 1, the table driving device 1 mainly includes a base plate 10, a rolling bearing 20, and a worm screw unit 30. These components are described in detail below.

The base plate 10 is a plate for arranging the rolling bearing 20 and the worm screw unit 30 thereon. The base plate 10 has a shape longer in the Y axis direction as viewed in the Z axis direction in FIG. 1. The base plate 10 includes a first plate portion 11 on which the rolling bearing 20 is disposed, and a second plate portion 12 on which the worm screw unit 30 is disposed. The first plate portion 11 and the second plate portion 12 are adjacent to each other in the Y axis direction in FIG. 1.

The first plate portion 11 and the second plate portion 12 each have an approximately quadrangular shape as viewed in the Z axis direction in FIG. 1. As shown in FIG. 1, the first plate portion 11 is formed to have a greater thickness in the Z axis direction than the second plate portion 12. The first plate portion 11 has an upper surface 11A and the second plate portion 12 has an upper surface 12A, which surfaces are parallel to the XY plane in FIG. 1, and are connected via a stepped surface 13 perpendicular to the Y axis direction in the figure.

In FIG. 2, the sign R1 denotes a rotation axis of the rolling bearing 20. As shown in FIG. 2, the first plate portion 11 has formed therein a center hole 14, an annular first recess 15 having a greater diameter than the center hole 14, and an annular second recess 16 having a greater diameter than the first recess 15. The center hole 14, the first recess 15, and the second recess 16 each have a center located on the rotation axis R1. In other words, the center hole 14, the first recess 15, and the second recess 16 are formed concentrically around the rotation axis R1. As shown in FIG. 1, the center hole 14 is a circular hole as viewed in the Z axis direction.

As shown in FIG. 2, the center hole 14 is a through hole that penetrates through the first plate portion 11 in the thickness direction (Z axis direction). The first recess 15 is formed deeper than the second recess 16. In other words, a distance in the Z axis direction from the upper surface 11A of the first plate portion 11 to a bottom surface of the first recess 15 is greater than a distance in the Z axis direction from the upper surface 11A to a bottom surface of the second recess 16. Stated from another point of view, a distance L1 in the Z axis direction from a lower surface 11B of the first plate portion 11 to the bottom surface of the first recess 15 is shorter than a distance L2 in the Z axis direction from the lower surface 11B to the bottom surface of the second recess 16. That is, a step is formed at the boundary between the first recess 15 and the second recess 16. The bottom surface of the first recess 15 and the bottom surface of the second recess 16 are both flat surfaces parallel to the XY plane (FIG. 1).

The rolling bearing 20 includes a worm wheel 21 having an annular shape (outer ring), an inner ring 22 having an annular shape, smaller in diameter than the worm wheel 21 and arranged radially inward of the worm wheel 21, and a cover 24 surrounding an outer circumferential surface of the worm wheel 21. As shown in FIG. 1, the worm wheel 21 and the inner ring 22 are arranged concentrically around the rotation axis R1.

As shown in FIG. 2, the inner ring 22 is disposed in the first recess 15 such that an end surface of the inner ring 22 in the Z axis direction contacts the bottom surface of the first recess 15. The inner ring 22 is fixed to the first plate portion 11 with screws B1 that penetrate through a portion of the first plate portion 11 corresponding to the first recess 15 and the inner ring 22 in the Z axis direction. As shown in FIG. 2, each screw B1 is inserted into the first plate portion 11 from the lower surface 11B toward the upper surface 11A such that a head of the screw B1 is positioned inside a through hole formed in the first plate portion 11. On the other hand, the worm wheel 21 is disposed in the second recess 16 in a state where an end surface of the worm wheel 21 in the Z axis direction faces the bottom surface side of the second recess 16.

The rolling bearing 20 further includes a plurality of rolling elements 23 arranged between an outer circumferential surface of the inner ring 22 and an inner circumferential surface of the worm wheel 21. The rolling elements 23 are, for example, cylindrical rollers, arranged in a ring shape around the rotation axis R1. In the present embodiment, the adjacent rolling elements 23 in the circumferential direction have their rolling axes orthogonal to each other, although the configuration is not limited thereto. Further, the rolling elements 23 are not limited to rollers, and may be balls.

As shown in FIG. 2, on the outer circumferential surface of the inner ring 22, an inner raceway surface 23A is formed for the rolling elements 23 to roll thereon. On the other hand, on the inner circumferential surface of the worm wheel 21, an outer raceway surface 21A for the rolling elements 23 to roll thereon is formed to face the inner raceway surface 23A. The inner raceway surface 23A and the outer raceway surface 21A are side walls of V-shaped grooves in the cross-sectional view in FIG. 2. The rolling elements 23 are aligned in the circumferential direction inside a ring-shaped space formed between the inner raceway surface 23A and the outer raceway surface 21A.

On the outer circumferential surface of the worm wheel 21, a first gear 21B is formed along the Z axis direction. This first gear 21B meshes with a worm screw 31 (shaft member). The configuration of the worm screw unit 30 is described in detail below.

As shown in FIG. 1, the worm screw unit 30 is disposed on the upper surface 12A of the second plate portion 12 and extends in the X axis direction in the figure. The worm screw unit 30 is for making the worm wheel 21 rotate around the rotation axis R1, and is adjacent to the rolling bearing 20 in the Y axis direction in FIG. 1.

Figure 3:
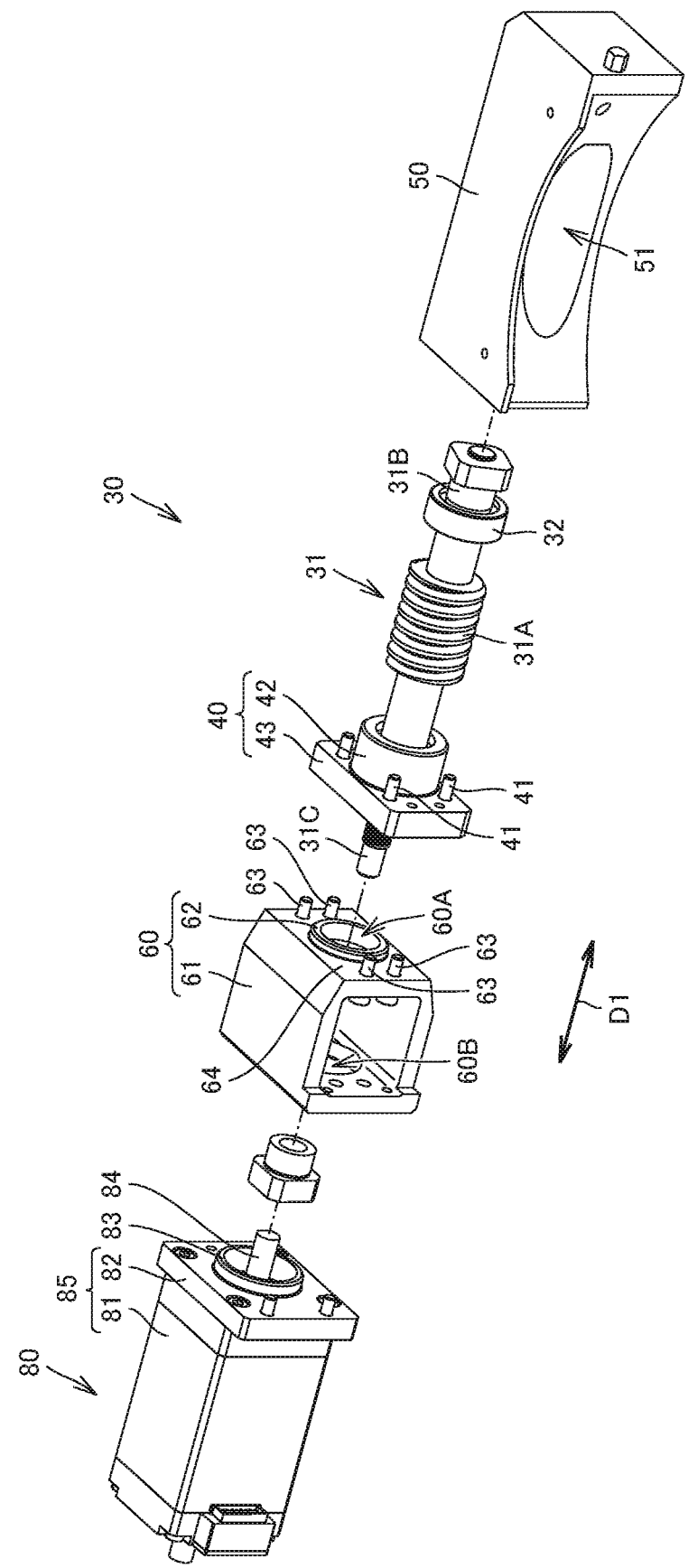
FIG. 3 is an exploded perspective view of a worm screw unit in Embodiment 1.
Figure 4:
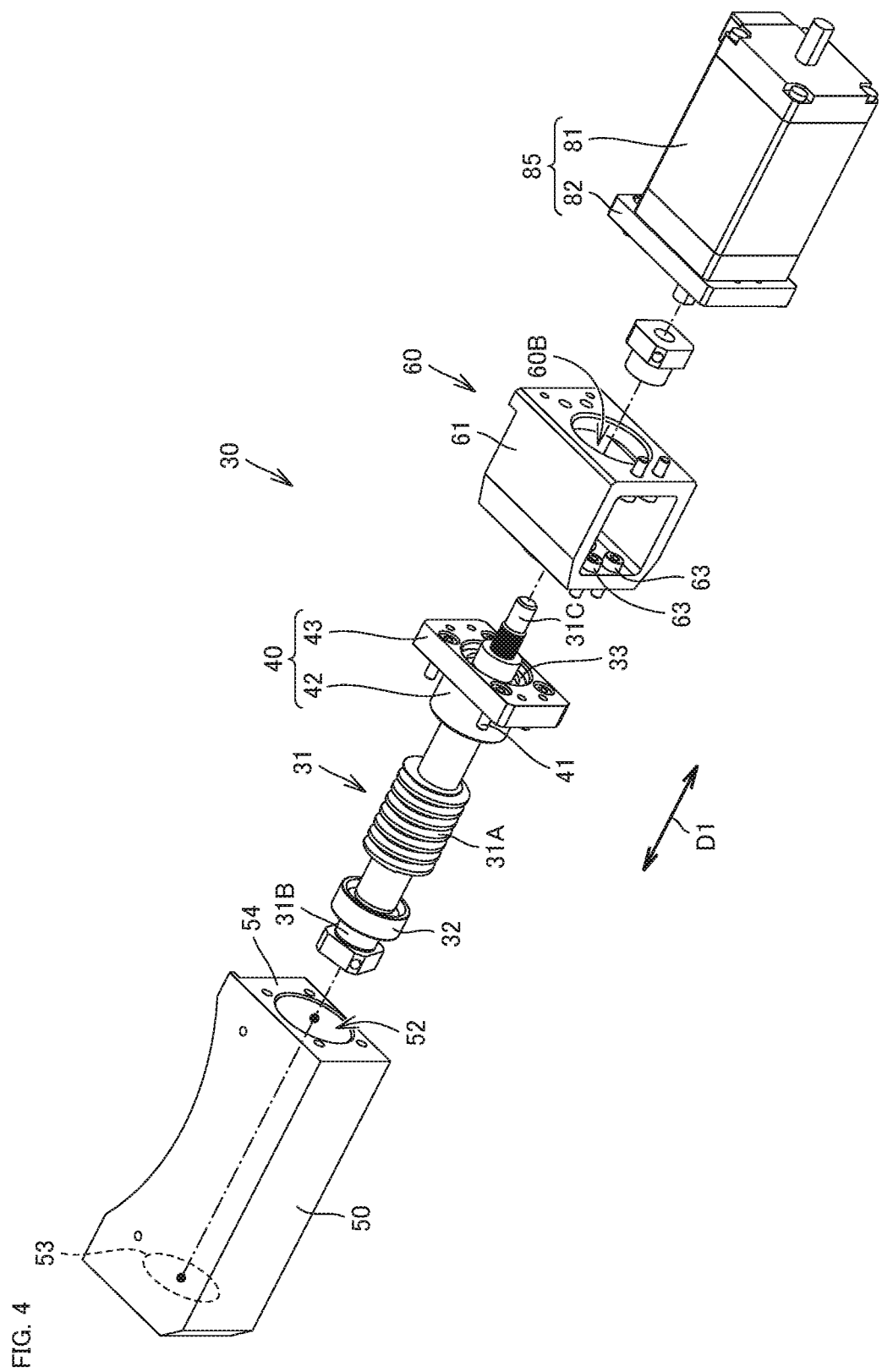
FIG. 4 is an exploded perspective view of the worm screw unit in Embodiment 1, as seen from another viewpoint.

FIGS. 3 and 4 are perspective views showing, in different viewpoints, the state where the components of the worm screw unit 30 are disassembled in an axial direction D1 (X axis direction in FIG. 1). Referring to FIGS. 3 and 4, the worm screw unit 30 mainly includes the worm screw 31 (shaft member), a support bearing 32 (first bearing), a fixed bearing 33 (second bearing), a worm screw housing 50 (first housing), a bearing housing 40 (second housing), a motor bracket 60, and a motor 80. These components are each described below.

The worm screw 31 has an approximately columnar shape, and extends in the axial direction D1. On an outer circumferential surface of the worm screw 31, a second gear 31A is formed in an intermediate portion in the axial direction D1 thereof, which gear meshes with the first gear 21B (FIG. 2). The worm screw 31 is inserted in both of the support bearing 32 and the fixed bearing 33. More specifically, as shown in FIGS. 3 and 4, the support bearing 32 is attached to a portion of the worm screw 31 on its first end 31B side with respect to the second gear 31A. On the other hand, the fixed bearing 33 is attached to a portion of the worm screw 31 on its second end 31C side with respect to the second gear 31A.

The worm screw housing 50 is a component for housing the worm screw 31, and extends in the axial direction D1. The worm screw housing 50 in the present embodiment has an approximately rectangular parallelepiped outer shape, with one side surface concave curved (FIG. 3). As shown in FIG. 3, the concave curved surface of the worm screw housing 50 has an oblong hole 51 of an elliptical shape formed to extend in the axial direction D1. In the state where the worm screw 31 is housed in the worm screw housing 50, the second gear 31A is exposed from the oblong hole 51 and meshes with the first gear 21B (FIG. 2). With the rotation of the worm screw 31 about the axis, the worm wheel 21 (FIG. 2) is driven to rotate around the rotation axis R1. On the worm wheel 21, a workpiece (not shown) or a plate member (not shown) for securing a workpiece is fixed. Thus, the worm wheel 21 is used as a table.

As shown in FIG. 4, the worm screw housing 50 has a first housing hole 53 and a second housing hole 52 formed therein. The first housing hole 53 and the second housing hole 52 are holes with circular cross sections perpendicular to the axial direction D1. The first housing hole 53 and the second housing hole 52 are spaced apart from each other in the axial direction D1. More specifically, as shown in FIG. 4, the second housing hole 52 is formed to penetrate through an end surface 54 (end surface facing the bearing housing 40 side) of the worm screw housing 50 in the axial direction D1. On the other hand, the first housing hole 53 is formed inside the worm screw housing 50, on an opposite side from the above-described end surface 54 with respect to the central portion in the axial direction D1.

The first housing hole 53 and the second housing hole 52 are formed by causing a drill or the like, for example, to move linearly in the axial direction D1 to cut the worm screw housing 50 along the axial direction D1 from the above-described end surface 54. Therefore, the first housing hole 53 and the second housing hole 52 are approximately identical in diameter and have coincident central axes.

The support bearing 32 is fitted in the first housing hole 53. The support bearing 32 thus allows a portion of the worm screw 31 on the first end 31B side to rotate in the circumferential direction relative to the worm screw housing 50. The worm screw 31 is inserted in the second housing hole 52. The second housing hole 52 has an inside diameter greater than an outside diameter of the worm screw 31.

The bearing housing 40 is a hollow component that is inserted in the second housing hole 52 of the worm screw housing 50 and has the fixed bearing 33 fitted therein. As shown in FIG. 4, the bearing housing 40 includes an annular portion 42 having a predetermined length in the axial direction D1, and a flange portion 43 extending radially outward from an end of the annular portion 42. The annular portion 42 is inserted in between an inner circumferential surface surrounding the second housing hole 52 and an outer circumferential surface of the worm screw 31, and has a shape following that inner circumferential surface. The annular portion 42 has an outside diameter substantially identical to the inside diameter of the second housing hole 52. As shown in FIG. 3, the flange portion 43 has a plurality of bolt holes formed through which bolts 41 penetrate. On the other hand, as shown in FIG. 4, the worm screw housing 50 has a plurality of female threaded holes formed around the second housing hole 52 in its end surface 54, for the male threads formed on the outer circumferential surfaces of the shaft portions of the bolts 41 to mesh therewith. The bearing housing 40 is attached to the worm screw housing 50 with the bolts 41, with the annular portion 42 inserted in the second housing hole 52 and a main surface of the flange portion 43 in contact with the end surface 54. In this state, the central axes of the first housing hole 53, the second housing hole 52, the worm screw 31, and the annular portion 42 are coincident with each other.

Figure 5:
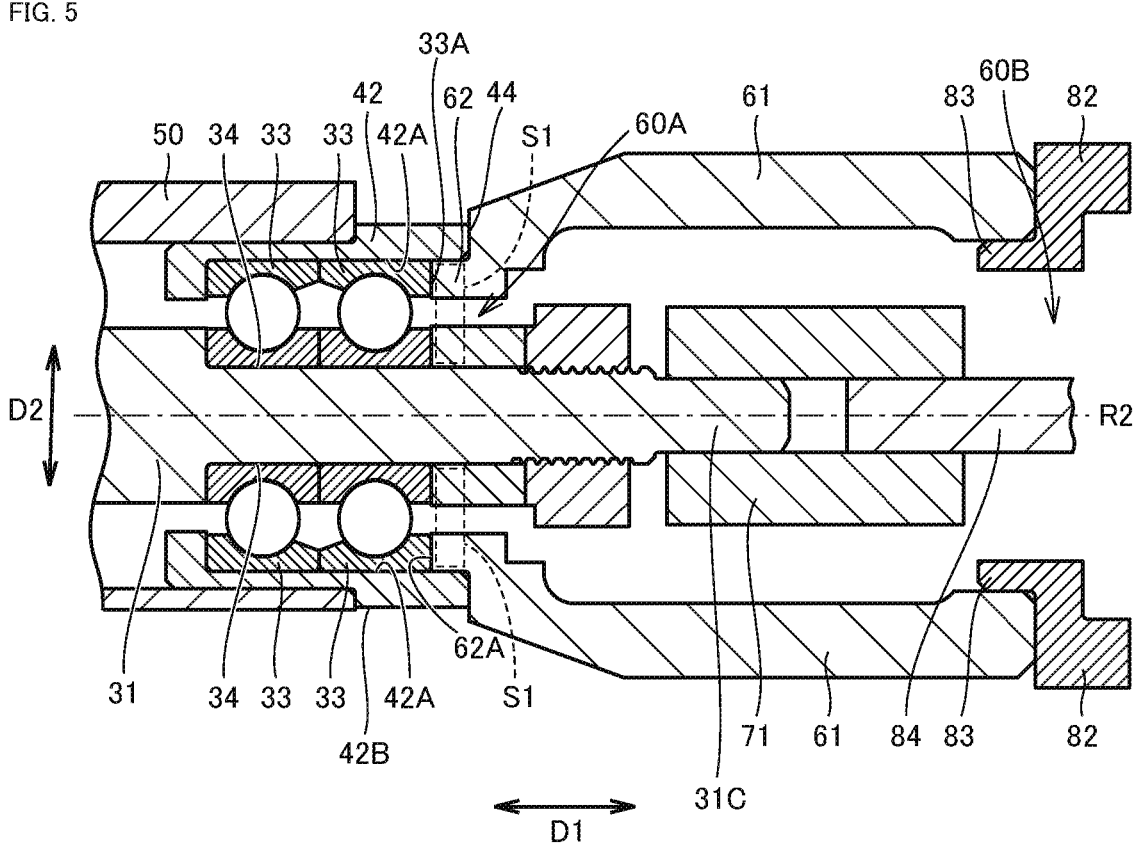
FIG. 5 is a partial cross-sectional view showing a cross section including a rotation axis of the worm screw unit in Embodiment 1.

FIG. 5 is a partial cross-sectional view including a central axis (rotation axis R2) of the worm screw 31. As shown in FIG. 5, a plurality of (in the present embodiment, two) fixed bearings 33 are arranged side by side in the axial direction D1. Each fixed bearing 33 is fitted in between an inner circumferential surface 42A of the annular portion 42 and the outer circumferential surface 34 at the small-diameter portion of the worm screw 31. The fixed bearings 33 thus allow the worm screw 31 to rotate in the circumferential direction relative to the bearing housing 40. Further, as shown in FIG. 5, the annular portion 42 has its tip end formed to extend inward in the radial direction D2 (direction perpendicular to the axial direction D1). This extending portion is in contact with the end surface of the fixed bearing 33 in the axial direction D1. The fixed bearing 33 is, for example, an angular contact ball bearing, although it is not limited thereto. The number of the fixed bearings 33 is also not particularly limited.

As shown in FIG. 5, between the inner circumferential surface 42A of the annular portion 42 and the outer circumferential surface 34 of the worm screw 31, an annular space S1 is formed which is adjacent to the fixed bearing 33 on its motor bracket 60 side in the axial direction D1 and surrounds the outer circumferential surface 34 of the worm screw 31. Stated from another point of view, an end surface 33A (end surface facing the motor bracket 60 side) of the fixed bearing 33 in the axial direction D1 is located on the worm screw housing 50 side than an end surface 44 (end surface facing the motor bracket 60 side) of the annular portion 42 in the axial direction D1. In other words, the length of the space S1 in the axial direction D1 corresponds to a distance in the axial direction D1 between the end surface 33A of the fixed bearing 33 and the end surface 44 of the annular portion 42. It should be noted that the inner circumferential surface 42A of the annular portion 42 is a cylindrical surface having its central axis coincident with that of an outer circumferential surface 42B of the annular portion 42.

The motor bracket 60 is a component disposed between the motor 80 and the bearing housing 40. As shown in FIG. 3, the motor bracket 60 includes a base portion 61, and a first protruding portion 62 that protrudes from the base portion 61 on the bearing housing 40 side and has an annular shape. The base portion 61 has a hollow, approximately rectangular parallelepiped shape. The base portion 61 has a rectangular opening formed on each side surface (FIGS. 3 and 4). The base portion 61 has a first bracket hole 60A and a second bracket hole 60B formed on its respective end surfaces in the axial direction D1 (FIGS. 3 and 4). The first bracket hole 60A and the second bracket hole 60B are approximately identical in diameter and have circular cross sections perpendicular to the axial direction D1. The first bracket hole 60A and the second bracket hole 60B are spaced apart from each other in the axial direction D1.

The first bracket hole 60A and the second bracket hole 60B are formed by causing a drill or the like, for example, to move linearly in the axial direction D1 to penetrate through the motor bracket 60 in the axial direction D1. Therefore, the first bracket hole 60A and the second bracket hole 60B have their central axes coincident with each other.

As shown in FIG. 3, the first protruding portion 62 protrudes from an end surface 64 of the base portion 61 facing one side in the axial direction D1 toward the bearing housing 40, and surrounds the first bracket hole 60A. On a wall portion of the base portion 61 including the end surface 64, a plurality of through holes are formed through which bolts 63 penetrate. On the other hand, as shown in FIG. 4, on an end surface (facing the motor bracket 60 side) of the flange portion 43 of the bearing housing 40, a plurality of female threaded holes are formed for the male threads formed on the outer circumferential surfaces of the shaft portions of the bolts 63 to mesh therewith. The motor bracket 60 is attached to the flange portion 43 of the bearing housing 40 with the bolts 63.

As shown in FIG. 5, the first protruding portion 62 is inserted into the space S1 between the inner circumferential surface 42A of the annular portion 42 and the outer circumferential surface 34 of the worm screw 31, and has its outer circumferential surface following the inner circumferential surface 42A. The first protruding portion 62 has its tip end surface 62A in contact with the end surface 33A of the fixed bearing 33 in the axial direction D1, more specifically the end surface in the axial direction D1 of an outer ring of the fixed bearing 33. With this, the fixed bearings 33 are pressed in advance in the axial direction D1 toward the worm screw housing 50 side. Further, as shown in FIG. 5, the worm screw 31 extends from the first bracket hole 60A toward the hollow portion inside the motor bracket 60. The central axis of the worm screw 31 coincides with the central axis of the first bracket hole 60A.

Figure 6:
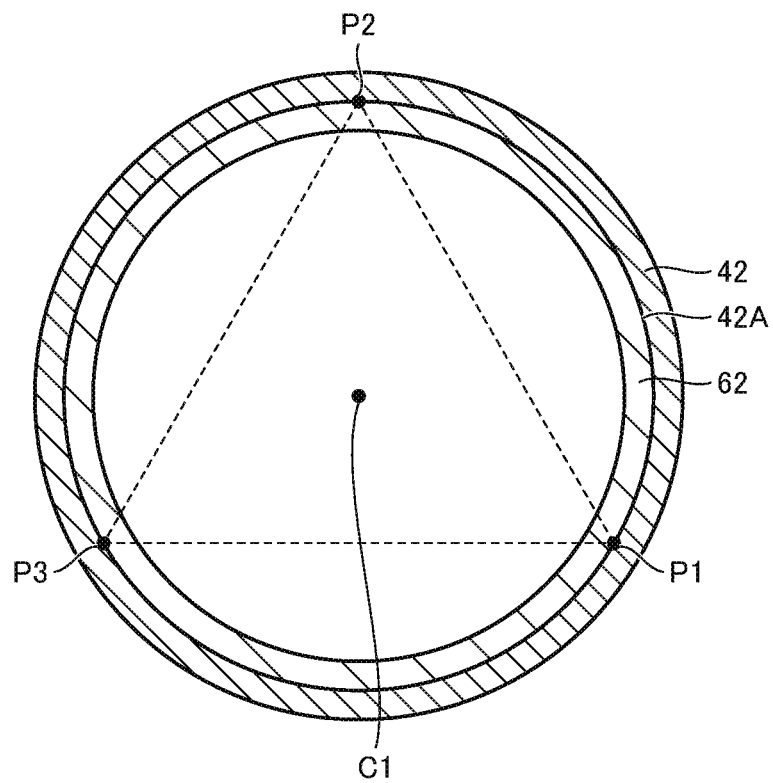
FIG. 6 is a schematic diagram of a connecting portion between a bearing housing and a motor bracket, as viewed in a direction in which the rotation axis extends.

FIG. 6 is a schematic diagram of the annular portion 42 and the first protruding portion 62 as viewed in the axial direction D1. As shown in FIG. 6, in the present embodiment, the first protruding portion 62 has an annular shape, and is in contact with the inner circumferential surface 42A of the annular portion 42 over the entire circumferential direction. Therefore, as viewed in the axial direction D1 (FIG. 6), the first protruding portion 62 is in contact with the inner circumferential surface 42A of the annular portion 42 such that a center C1 of the annular portion 42 is located inside a triangle obtained by connecting three points P1, P2, and P3 selected arbitrarily from a part of the first protruding portion 62 contacting the inner circumferential surface 42A of the annular portion 42.

The motor 80 is for making the worm screw 31 rotate about an axis. As shown in FIG. 3, the motor 80 includes a body portion 85, and a second protruding portion 83 that protrudes from the body portion 85 on the motor bracket 60 side and has an annular shape. The body portion 85 includes a motor housing 81 of a rectangular parallelepiped shape accommodating a drive source, and a plate member 82 having a greater diameter than the motor housing 81 and attached to an end surface (facing the motor bracket 60 side) of the motor housing 81 in the axial direction D1. It should be noted that the plate member 82 is configured as a component separate from the rectangular parallelepiped motor housing 81 accommodating the drive source.

As shown in FIG. 3, the second protruding portion 83 protrudes from a main surface of the plate member 82 toward the motor bracket 60 side in the axial direction D1 and surrounds an output shaft 84 of the motor 80. As shown in FIG. 5, the central axis of this output shaft 84 coincides with the central axis of the second bracket hole 60B. The output shaft 84 has its tip end connected to the second end 31C of the worm screw 31 via a coupling 71. The second protruding portion 83 is inserted into the second bracket hole 60B, and follows an inner circumferential surface surrounding the second bracket hole 60B.

Figure 7:
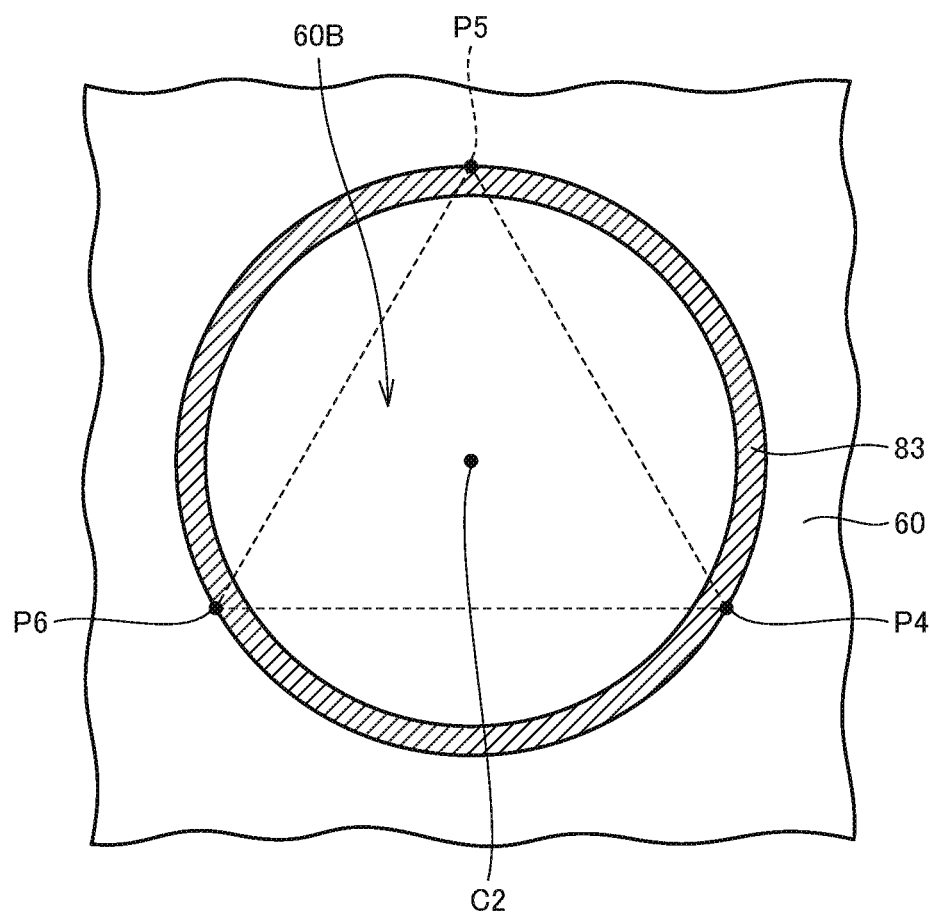
FIG. 7 is a schematic diagram of a connecting portion between the motor bracket and a motor, as viewed in the rotation axis extending direction.

FIG. 7 is a schematic diagram of the motor bracket 60 and the second protruding portion 83 as viewed in the axial direction D1. As shown in FIG. 7, in the present embodiment, the second protruding portion 83 has an annular shape, and is in contact with the inner circumferential surface surrounding the second bracket hole 60B over the entire circumferential direction. Therefore, as viewed in the axial direction D1 (FIG. 7), the second protruding portion 83 is in contact with the inner circumferential surface surrounding the second bracket hole 60B such that a center C2 of the second bracket hole 60B is located inside a triangle obtained by connecting three points P4, P5, and P6 selected arbitrarily from a part of the second protruding portion 83 contacting that inner circumferential surface.

An operation of the table driving device 1 according to the present embodiment will now be described. First, when the motor 80 is driven, the rotation of the output shaft 84 is transmitted to the worm screw 31 via the coupling 71. This makes the worm screw 31 rotate about the axis. Then, the rotation of the worm screw 31 is transmitted to the worm wheel 21 having the first gear 21B formed thereon that meshes with the second gear 31A. As a result, the worm wheel 21 rotates around the rotation axis R1.

Functional effects of the table driving device 1 according to the present embodiment will now be described. In the table driving device 1, the first housing hole 53 and the second housing hole 52 are formed in one step in which a drill or other tool, for example, is linearly moved, so the two holes have coincident central axes. Therefore, as the support bearing 32 is fitted in the first housing hole 53 and the worm screw 31 is inserted in the support bearing 32 and the second housing hole 52, the central axis of the worm screw 31 coincides with the central axes of the first housing hole 53 and the second housing hole 52. Then, the annular portion 42 of the bearing housing 40, having an outside diameter substantially identical to the inside diameter of the second housing hole 52, is inserted in between the inner circumferential surface surrounding the second housing hole 52 and the outer circumferential surface 34 of the worm screw 31, whereby the central axis of the annular portion 42 coincides with the central axes of the first housing hole 53, the second housing hole 52, and the worm screw 31.

In this state, the first protruding portion 62 of the motor bracket 60 is inserted into the annular space S1, which is located between the inner circumferential surface 42A of the annular portion 42 and the outer circumferential surface 34 of the worm screw 31 and is adjacent to the fixed bearing 33 on the motor bracket 60 side, and the outer circumferential surface of the first protruding portion 62 is brought into contact with the inner circumferential surface 42A of the annular portion 42, whereby the motor bracket 60 can be easily disposed coaxially with respect to the bearing housing 40. Moreover, as the first protruding portion 62 is in contact with the end surface 33A of the fixed bearing 33 in the axial direction D1, the first protruding portion 62 can press the fixed bearing 33 in the axial direction D1. This eliminates the need to provide another member for pressing the fixed bearing 33, leading to reduction in the number of components.

Embodiment 2

A table driving device according to Embodiment 2 will now be described. While the table driving device according to the present embodiment basically has a similar configuration and provides similar effects as the table driving device 1 according to Embodiment 1 above, it differs from the table driving device 1 according to Embodiment 1 in that the table is linearly driven in accordance with the rotation of a shaft member about an axis. The following explains only the points different from the table driving device 1 according to Embodiment 1.

The shaft member in the present embodiment is a ball screw, for example, and the motor 80 is driven to make a screw shaft (not shown) rotate about an axis. Furthermore, the table in the present embodiment is fixed to a nut of the ball screw, and is linearly driven together with the nut in accordance with the rotation of the screw shaft. As such, the table driving device of the present disclosure is also applicable to uses other than the rotary table.

Other Embodiments

Other embodiments will now be described. The first protruding portion 62 is not limited to the case having an annular shape; it only has to be in contact with the inner circumferential surface 42A of the annular portion 42 such that its center C1 is located inside the above-described triangle connecting the three points P1, P2, and P3. For example, the first protruding portion may be composed of a plurality of arc-shaped portions that are in contact with the inner circumferential surface 42A of the annular portion 42 and spaced apart from each other in the circumferential direction.

The second protruding portion 83 is not limited to the case having an annular shape; it only has to be in contact with the inner circumferential surface surrounding the second bracket hole 60B such that its center C2 is located inside the above-described triangle connecting the three points P4, P5, and P6. For example, the second protruding portion may be composed of a plurality of arc-shaped portions that are in contact with the inner circumferential surface surrounding the second bracket hole 60B and spaced apart from each other in the circumferential direction. Furthermore, in the motor 80, the second protruding portion 83 may be omitted.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: table driving device; 10: base plate; 11: first plate portion; 11A: upper surface; 11B: lower surface; 12: second plate portion; 12A: upper surface; 13: stepped surface; 14: center hole; 15: first recess; 16: second recess; 20: rolling bearing (table); 21: worm wheel; 21A: outer raceway surface; 21B: first gear; 22: inner ring; 23: rolling element; 23A: inner raceway surface; 24: cover; 30: worm screw unit; 31: worm screw (shaft member); 31A: second gear; 31B: first end; 31C: second end; 32: support bearing (first bearing); 33: fixed bearing (second bearing); 33A: end surface; 34: outer circumferential surface; 40: bearing housing (second housing); 41: bolt; 42: annular portion; 42A: inner circumferential surface; 42B: outer circumferential surface; 43: flange portion; 44: end surface; 50: worm screw housing (first housing); 51: oblong hole; 52: second housing hole; 53: first housing hole; 54: end surface; 60: motor bracket (bracket); 60A: first bracket hole; 60B: second bracket hole; 61: base portion; 62: first protruding portion; 62A: tip end surface; 63: bolt; 64: end surface; 71: coupling; 80: motor; 81: motor housing; 82: plate member; 83: second protruding portion; 84: output shaft; 85: body portion; B1: screw; C1, C2: center; D1: axial direction; D2: radial direction; L1, L2: distance; P1, P2, P3, P4, P5, P6: point; R1, R2: rotation axis; and S1: space.

The invention claimed is:

1. A table driving device comprising:
a first housing extending in an axial direction and having formed therein a first housing hole and a second housing hole each having a circular cross section perpendicular to the axial direction, the first housing hole and the second housing hole being spaced apart from each other in the axial direction and having coincident central axes;
a first bearing fitted in the first housing hole;
a shaft member extending in the axial direction and inserted in the first bearing and the second housing hole;
a second housing including an annular portion, the annular portion being inserted in between an inner circumferential surface surrounding the second housing hole and an outer circumferential surface of the shaft member and following the inner circumferential surface;
a second bearing fitted in between an inner circumferential surface of the annular portion and the outer circumferential surface of the shaft member;
a motor operative to rotate the shaft member about an axis;
a bracket arranged between the motor and the second housing, an end of a shaft of the motor being connected to an end of the shaft member within the bracket; and
a table driven in accordance with rotation of the shaft member about the axis;
an annular space being formed between the inner circumferential surface of the annular portion and the outer circumferential surface of the shaft member, the inner circumferential surface of the annular portion being cylindrical and having a coincident central axis with an outer circumferential surface thereof, the space being adjacent to the second bearing on the bracket side in the axial direction and surrounding the outer circumferential surface of the shaft member,
the bracket including a base portion, and a first protruding portion protruding from the base portion on the second housing side, the first protruding portion being inserted into the annular space and following the inner circumferential surface of the annular portion,
the first protruding portion being in contact with an end surface of the second bearing in the axial direction,
as viewed in the axial direction, the first protruding portion being in contact with at least a part of the inner circumferential surface of the annular portion in such a manner that a center of the annular portion is located inside a triangle obtained by connecting three points from a part of the first protruding portion in contact with the inner circumferential surface of the annular portion.

2. The table driving device according to claim 1, wherein the first protruding portion is in contact with the inner circumferential surface of the annular portion over an entire circumferential direction thereof.

3. The table driving device according to claim 1, wherein the base portion has formed therein a first bracket hole surrounded by the first protruding portion and having a circular cross section perpendicular to the axial direction, and a second bracket hole having a circular cross section perpendicular to the axial direction,
the first bracket hole and the second bracket hole are spaced apart from each other in the axial direction and have coincident central axes,
the motor includes a body portion, and a second protruding portion protruding from the body portion on the bracket side, the second protruding portion being inserted into the second bracket hole and following an inner circumferential surface surrounding the second bracket hole, and
as viewed in the axial direction, the second protruding portion is in contact with at least a part of the inner circumferential surface surrounding the second bracket hole in such a manner that a center of the second bracket hole is located inside a triangle obtained by connecting three points selected arbitrarily from a part of the second protruding portion in contact with the inner circumferential surface surrounding the second bracket hole.

4. The table driving device according to claim 3, wherein the second protruding portion is in contact with the inner circumferential surface surrounding the second bracket hole over an entire circumferential direction thereof.

* * * * *